US010787092B2

United States Patent
Hou et al.

(10) Patent No.: US 10,787,092 B2
(45) Date of Patent: Sep. 29, 2020

(54) MOBILE CHARGING APPARATUS AND METHOD FOR CHARGING AN ELECTRIC VEHICLE

(71) Applicants: STATE GRID CHONGQING ELECTRIC POWER CO. ELECTRIC POWER RESEARCH INSTITUTE, Chongqing (CN); STATE GRID CHONGQING ELECTRIC POWER COMPANY, Chongqing (CN); STATE GRID CORPORATION OF CHINA, Beijing (CN)

(72) Inventors: Xingzhe Hou, Chongqing (CN); Yi Long, Chongqing (CN); Liankai Chen, Chongqing (CN); Guojun He, Chongqing (CN); Zhi Li, Chongqing (CN); Yongxiang Liu, Chongqing (CN); Hongliang Sun, Chongqing (CN); Bin Zhu, Chongqing (CN); Jing Zhang, Chongqing (CN); Huicai Wang, Chongqing (CN); Tingting Xu, Chongqing (CN); Li Zhou, Chongqing (CN); Lin Gong, Chongqing (CN); Xiaorui Hu, Chongqing (CN)

(73) Assignees: STATE GRID CHONGQING ELECTRIC POWER CO. ELECTRIC POWER RESEARCH INSTITUTE (CN); STATE GRID CHONGQING ELECTRIC POWER COMPANY (CN); STATE GRID CORPORATION OF CHINA (CN)

( * ) Notice: Subject to any disclaimer, the term of this patent is extended or adjusted under 35 U.S.C. 154(b) by 403 days.

(21) Appl. No.: 15/750,892

(22) PCT Filed: Dec. 12, 2017

(86) PCT No.: PCT/CN2017/115743
§ 371 (c)(1),
(2) Date: Feb. 7, 2018

(87) PCT Pub. No.: WO2019/052039
PCT Pub. Date: Mar. 21, 2019

(65) Prior Publication Data
US 2020/0086754 A1  Mar. 19, 2020

(30) Foreign Application Priority Data
Sep. 13, 2017  (CN) .......................... 2017 1 0823180

(51) Int. Cl.
*B60L 53/80* (2019.01)
*B60L 53/35* (2019.01)
(Continued)

(52) U.S. Cl.
CPC ............... *B60L 53/35* (2019.02); *B60L 53/53* (2019.02); *B60L 53/62* (2019.02); *B60L 53/80* (2019.02); *H02J 7/02* (2013.01)

(58) Field of Classification Search
CPC . H02J 7/0027; H02J 7/02; B60L 53/35; B60L 53/53; B60L 53/62; B60L 53/80; B60L 53/16
(Continued)

(56) References Cited

U.S. PATENT DOCUMENTS

4,700,121 A * 10/1987 Neri .......................... B25J 5/007
320/109
5,834,922 A * 11/1998 Ikawa ................. H02J 13/0003
320/136
(Continued)

FOREIGN PATENT DOCUMENTS

CN 200988037 Y * 12/2007
CN 101823473     9/2010
(Continued)

OTHER PUBLICATIONS

Patent Cooperation Treaty (PCT), International Search Report and Written Opinion for Application PCT/CN2017/115743 filed Dec.

12, 2017, dated Jun. 13, 2018, International Searching Authority, CN.

Primary Examiner — John T Trischler
(74) Attorney, Agent, or Firm — McDonald Hopkins LLC (57) ABSTRACT

A method for charging an electric vehicle is provided. The method includes that a mobile charging apparatus transmits its own status information to a centralized battery distribution station; the centralized battery distribution station determines, according to the received status information, whether power of a battery of the mobile charging apparatus is less than a first threshold; if the power of the battery of the mobile charging apparatus is less than the first threshold, the battery of the mobile charging apparatus is processed so that the power of the battery of the mobile charging apparatus is greater than a second threshold, wherein the second threshold is greater than the first threshold; and if the power of the battery of the mobile charging apparatus is not less than the first threshold, the mobile charging apparatus charges the electric vehicle.

8 Claims, 9 Drawing Sheets

(51) Int. Cl.
   B60L 53/53    (2019.01)
   B60L 53/62    (2019.01)
   H02J 7/02     (2016.01)
(58) Field of Classification Search
   USPC .......................................................... 320/109
   See application file for complete search history.

(56) References Cited

U.S. PATENT DOCUMENTS

| | | | | |
|---|---|---|---|---|
| 6,157,162 | A * | 12/2000 | Hayashi | H02J 50/90 320/104 |
| RE37,678 | E * | 4/2002 | Ikawa | H02J 7/00047 320/136 |
| RE39,908 | E * | 11/2007 | Ikawa | H02J 3/32 320/136 |
| 7,602,143 | B2 * | 10/2009 | Capizzo | B60L 53/66 320/109 |
| 8,098,042 | B2 * | 1/2012 | Nakayama | B25J 19/005 320/107 |
| 8,164,302 | B2 * | 4/2012 | Capizzo | B60L 53/305 320/109 |
| 8,299,754 | B2 * | 10/2012 | Hayashigawa | B60L 53/305 320/109 |
| 8,461,804 | B1 * | 6/2013 | Capizzo | B60L 53/60 320/109 |
| 8,640,629 | B2 * | 2/2014 | Barbee | B60L 7/24 105/61 |
| 8,922,163 | B2 * | 12/2014 | Macdonald | A47F 10/00 320/109 |
| 8,963,481 | B2 * | 2/2015 | Prosser | B60L 53/18 320/104 |
| 8,970,341 | B2 * | 3/2015 | Park | B60L 3/12 340/4.3 |
| 9,007,020 | B2 * | 4/2015 | Prosser | B60L 53/53 320/109 |
| 9,056,555 | B1 * | 6/2015 | Zhou | B60L 11/1827 |
| 9,083,191 | B2 * | 7/2015 | Yang | H02J 7/0042 |
| 9,139,310 | B1 * | 9/2015 | Wang | B64C 39/02 |
| 9,143,008 | B2 * | 9/2015 | Aisu | H02J 13/00028 13/28 |
| 9,166,257 | B2 * | 10/2015 | Brun-Buisson | G06F 9/02 |
| 9,187,004 | B1 * | 11/2015 | Davis | B60L 53/30 |
| 9,193,065 | B2 * | 11/2015 | Wang | B25J 13/06 |
| 9,193,277 | B1 * | 11/2015 | Penilla | G07C 5/0866 |
| 9,284,062 | B2 * | 3/2016 | Wang | B60L 53/52 |
| 9,346,560 | B2 * | 5/2016 | Wang | B60L 53/80 |
| 9,356,445 | B2 * | 5/2016 | Ge | B60L 58/40 |
| 9,371,008 | B2 * | 6/2016 | Bouman | H02J 2207/40 |
| 9,424,697 | B2 * | 8/2016 | Wu | B60L 58/26 |
| 9,440,545 | B2 * | 9/2016 | Wang | B64F 1/20 |
| 9,488,493 | B2 * | 11/2016 | MacNeille | G01C 21/3697 |
| 9,492,922 | B1 * | 11/2016 | Johnson | G05D 1/0297 |
| 9,496,750 | B2 * | 11/2016 | Hayashigawa | B60L 58/40 |
| 9,499,064 | B2 * | 11/2016 | Chazal | B60L 3/0046 |
| 9,499,265 | B2 * | 11/2016 | Sanz | B64F 1/02 |
| 9,550,582 | B2 * | 1/2017 | Wang | B60L 53/00 |
| 9,551,989 | B2 * | 1/2017 | Scarlatti | B64C 39/024 |
| 9,552,682 | B2 * | 1/2017 | Luke | B60L 1/14 |
| 9,555,715 | B2 * | 1/2017 | Sugano | B60L 1/003 |
| 9,566,868 | B2 * | 2/2017 | Jammer | B60L 11/1816 |
| 9,592,742 | B1 * | 3/2017 | Sosinov | G05D 1/0225 |
| 9,662,995 | B2 * | 5/2017 | Wu | B60L 53/305 |
| 9,711,985 | B1 * | 7/2017 | Johnson | H04W 4/80 |
| 9,744,870 | B2 * | 8/2017 | Cronie | B60L 11/182 |
| 9,770,993 | B2 * | 9/2017 | Zhao | B60L 53/37 |
| 9,815,377 | B2 * | 11/2017 | Wu | B60L 11/1818 |
| 9,830,753 | B2 * | 11/2017 | Luke | B60L 55/00 |
| 9,868,421 | B2 * | 1/2018 | Hassounah | B60S 5/06 |
| 9,873,408 | B2 * | 1/2018 | Capizzo | B60L 53/36 |
| 9,932,019 | B2 * | 4/2018 | Hassounah | B60S 5/06 |
| 9,944,192 | B2 * | 4/2018 | Ricci | B60L 53/32 |
| 10,011,181 | B2 * | 7/2018 | Dudar | H01F 38/14 |
| 10,040,359 | B2 * | 8/2018 | Chen | G07F 7/06 |
| 10,040,578 | B2 * | 8/2018 | Miller | B64C 39/024 |
| 10,055,911 | B2 * | 8/2018 | Luke | B60L 3/0061 |
| 10,071,641 | B2 * | 9/2018 | Ricci | H02J 50/30 |
| 10,093,195 | B2 * | 10/2018 | Ricci | B60L 5/18 |
| 10,112,499 | B2 * | 10/2018 | Shi | B60L 55/00 |
| 10,183,584 | B2 * | 1/2019 | Ricci | B60L 53/64 |
| 10,220,717 | B2 * | 3/2019 | Ricci | B60L 53/14 |
| 10,345,843 | B2 * | 7/2019 | Luke | B60L 1/003 |
| 10,363,826 | B2 * | 7/2019 | Wang | B60L 53/80 |
| 10,369,890 | B1 * | 8/2019 | Sosinov | B60L 53/12 |
| 10,369,974 | B2 * | 8/2019 | Carlson | B60L 53/60 |
| 10,391,873 | B2 * | 8/2019 | Kohnke | G05D 1/0295 |
| 10,399,461 | B1 * | 9/2019 | Sosinov | B60L 53/14 |
| 10,427,530 | B2 * | 10/2019 | Ricci | B60L 53/32 |
| 10,442,312 | B2 * | 10/2019 | Liang | B60L 53/80 |
| 10,459,471 | B2 * | 10/2019 | Luke | G01C 21/3476 |
| 10,532,663 | B2 * | 1/2020 | Ricci | B60L 53/62 |
| 10,549,915 | B1 * | 2/2020 | Theobald | B25J 9/00 |
| 10,611,251 | B2 * | 4/2020 | Ricci | B60L 53/665 |
| 10,632,852 | B2 * | 4/2020 | Ricci | B60L 3/0023 |
| 2003/0209375 | A1 * | 11/2003 | Suzuki | B60L 58/14 180/65.22 |
| 2004/0093650 | A1 * | 5/2004 | Martins | B25J 5/007 180/167 |
| 2007/0113921 | A1 * | 5/2007 | Capizzo | B60S 5/02 141/231 |
| 2008/0077511 | A1 * | 3/2008 | Zimmerman | G06Q 10/00 705/28 |
| 2009/0314382 | A1 * | 12/2009 | Capizzo | G07F 15/005 141/2 |
| 2011/0055037 | A1 * | 3/2011 | Hayashigawa | B60L 53/51 705/26.1 |
| 2011/0156642 | A1 * | 6/2011 | Noguchi | B60L 53/16 320/109 |
| 2012/0019203 | A1 * | 1/2012 | Kressner | B60L 3/0069 320/109 |
| 2012/0045303 | A1 * | 2/2012 | Macdonald | A47F 10/00 414/373 |
| 2012/0078553 | A1 * | 3/2012 | Kuroda | G01C 21/3679 702/63 |
| 2012/0130655 | A1 * | 5/2012 | Mitsuda | B60L 53/80 702/58 |
| 2012/0181992 | A1 * | 7/2012 | Brun-Buisson | H01M 10/30 320/153 |

(56) References Cited

U.S. PATENT DOCUMENTS

| | | | |
|---|---|---|---|
| 2012/0271758 A1* | 10/2012 | Jammer | B60L 50/66 705/39 |
| 2012/0299531 A1* | 11/2012 | Prosser | B60L 53/00 320/104 |
| 2012/0299544 A1* | 11/2012 | Prosser | B60L 53/80 320/109 |
| 2012/0303213 A1* | 11/2012 | Prosser | H02J 7/342 701/36 |
| 2012/0303259 A1* | 11/2012 | Prosser | H02J 2207/40 701/400 |
| 2012/0303397 A1* | 11/2012 | Prosser | B60L 53/00 705/7.12 |
| 2013/0026972 A1* | 1/2013 | Luke | B60L 7/22 320/106 |
| 2013/0027183 A1* | 1/2013 | Wu | H02J 4/00 340/5.64 |
| 2013/0030580 A1* | 1/2013 | Luke | G06Q 10/02 700/286 |
| 2013/0030581 A1* | 1/2013 | Luke | B60L 58/26 700/286 |
| 2013/0049677 A1* | 2/2013 | Bouman | B60L 58/20 320/106 |
| 2013/0049689 A1* | 2/2013 | Hayashigawa | B60L 50/40 320/109 |
| 2013/0124320 A1* | 5/2013 | Kamer | B60L 53/68 705/14.54 |
| 2013/0127417 A1* | 5/2013 | Kamer | B60L 53/50 320/109 |
| 2013/0167752 A1* | 7/2013 | Barbee | B61C 3/02 105/1.4 |
| 2013/0193242 A1* | 8/2013 | Giletta | E01H 10/007 239/668 |
| 2013/0197710 A1* | 8/2013 | Hansen | H02J 3/14 700/297 |
| 2013/0257349 A1* | 10/2013 | Yang | H02J 7/0042 320/107 |
| 2013/0342310 A1* | 12/2013 | Park | B60L 58/30 340/5.7 |
| 2014/0129059 A1* | 5/2014 | Scarlatti | G05D 1/00 701/16 |
| 2014/0159662 A1* | 6/2014 | Furui | G05B 13/024 320/112 |
| 2014/0266006 A1* | 9/2014 | Luke | B60L 53/31 320/106 |
| 2014/0277847 A1* | 9/2014 | Cann | B60L 3/0084 701/2 |
| 2014/0347017 A1* | 11/2014 | Sugano | H01M 10/44 320/137 |
| 2014/0354229 A1* | 12/2014 | Zhao | B60L 11/1846 320/109 |
| 2015/0047947 A1* | 2/2015 | Tait | B60L 53/305 198/339.1 |
| 2015/0202981 A1* | 7/2015 | Chazal | B60L 3/0046 701/22 |
| 2015/0321571 A1* | 11/2015 | Penilla | B60L 53/14 320/104 |
| 2016/0039540 A1* | 2/2016 | Wang | G05D 1/102 244/114 R |
| 2016/0039542 A1* | 2/2016 | Wang | B60L 53/51 701/2 |
| 2016/0048130 A1* | 2/2016 | Vavrick | B60L 53/80 180/168 |
| 2016/0068075 A1* | 3/2016 | Chen | B60K 1/00 320/107 |
| 2016/0129793 A1* | 5/2016 | Cronie | B60L 11/182 320/109 |
| 2016/0159239 A1* | 6/2016 | Shi | B60L 53/14 320/134 |
| 2016/0167807 A1* | 6/2016 | Wang | B60L 53/51 701/16 |
| 2016/0236582 A1* | 8/2016 | Wang | B60L 53/14 |
| 2016/0352113 A1* | 12/2016 | Zhao | B60L 53/14 |
| 2016/0368464 A1* | 12/2016 | Hassounah | B60S 5/06 |
| 2016/0375779 A1* | 12/2016 | Wang | B64F 1/18 701/2 |
| 2017/0004712 A1* | 1/2017 | Yang | G06Q 50/30 |
| 2017/0008411 A1* | 1/2017 | Wu | B60L 53/16 |
| 2017/0008412 A1* | 1/2017 | Wu | B60L 53/305 |
| 2017/0088288 A1* | 3/2017 | Wang | B64F 1/362 |
| 2017/0136881 A1* | 5/2017 | Ricci | B60L 5/18 |
| 2017/0136882 A1* | 5/2017 | Ricci | G06Q 50/06 |
| 2017/0136885 A1* | 5/2017 | Ricci | B60L 53/38 |
| 2017/0136887 A1* | 5/2017 | Ricci | B60L 53/63 |
| 2017/0136888 A1* | 5/2017 | Ricci | B60L 53/12 |
| 2017/0136889 A1* | 5/2017 | Ricci | B60L 55/00 |
| 2017/0136890 A1* | 5/2017 | Ricci | H02J 7/35 |
| 2017/0136891 A1* | 5/2017 | Ricci | B60L 53/124 |
| 2017/0136892 A1* | 5/2017 | Ricci | B60L 53/12 |
| 2017/0136893 A1* | 5/2017 | Ricci | B60L 53/38 |
| 2017/0136902 A1* | 5/2017 | Ricci | B60L 53/36 |
| 2017/0136903 A1* | 5/2017 | Ricci | B60L 53/305 |
| 2017/0136904 A1* | 5/2017 | Ricci | B60L 53/126 |
| 2017/0136912 A1* | 5/2017 | Ricci | B60L 53/32 |
| 2017/0140349 A1* | 5/2017 | Ricci | B60L 3/0023 |
| 2017/0140603 A1* | 5/2017 | Ricci | B60L 53/12 |
| 2017/0174091 A1* | 6/2017 | Miller | B64C 39/024 |
| 2017/0174092 A1* | 6/2017 | Kohnke | B60L 53/80 |
| 2017/0282734 A1* | 10/2017 | Noorani | B60L 50/50 |
| 2017/0283090 A1* | 10/2017 | Miller | B60L 53/80 |
| 2017/0327091 A1* | 11/2017 | Capizzo | G05D 1/0011 |
| 2017/0355271 A1* | 12/2017 | Cronie | B60L 53/12 |
| 2017/0355354 A1* | 12/2017 | Hassounah | B60L 53/80 |
| 2018/0086212 A1* | 3/2018 | Dudar | B60L 53/12 |
| 2018/0178663 A9* | 6/2018 | Wang | B64F 1/20 |
| 2018/0311835 A1* | 11/2018 | Baumgartner | B25J 19/005 |
| 2019/0009756 A1* | 1/2019 | Jacobs | B60S 5/00 |
| 2019/0016312 A1* | 1/2019 | Carlson | B60L 53/60 |
| 2019/0016384 A1* | 1/2019 | Carlson | G06Q 10/00 |
| 2019/0084432 A1* | 3/2019 | Liang | B64C 39/024 |
| 2019/0337407 A1* | 11/2019 | Wang | B60L 53/14 |
| 2020/0086753 A1* | 3/2020 | Hou | H02J 7/0047 |
| 2020/0101850 A1* | 4/2020 | Harty | B60L 58/13 |

FOREIGN PATENT DOCUMENTS

| | | | |
|---|---|---|---|
| CN | 103078361 A | 5/2013 | |
| CN | 104917232 A | 9/2015 | |
| CN | 104935038 | 9/2015 | |
| CN | 205292584 | 6/2016 | |
| CN | 205311360 | 6/2016 | |
| CN | 106033900 | 10/2016 | |
| CN | 106934581 | 7/2017 | |
| CN | 107453441 | 12/2017 | |
| JP | 2005238969 A * | 9/2005 | ............ B60L 58/20 |
| WO | WO-2018108019 A1 * | 6/2018 | ............ B60L 50/50 |

* cited by examiner

MOBILE CHARGING APPARATUS AND METHOD FOR CHARGING AN ELECTRIC VEHICLE

CROSS-REFERENCE TO RELATED APPLICATION

This application is a 35 U.S.C. 371 national stage filing of PCT Application No. PCT/CN2017/115743 filed on Dec. 12, 2017, which claims priority to Chinese Patent Application No. 201710823180.7 filed on Sep. 13, 2017, each of which are incorporated herein in their entirety by reference.

TECHNICAL FIELD

The present disclosure relates to techniques for charging an electric vehicle and, in particular, to a mobile charging apparatus and method for charging an electric vehicle.

BACKGROUND

It is a trend to use electric energy instead of fossil fuel as vehicle energy. Electric vehicles powered by new energy will be a development trend in the future. With the development of electric vehicles, the problems of difficulty in charging electric vehicles, low utilization efficiency of charging spots, a great impact of charging facilities on a distribution network and a huge investment in distribution network reconstruction are becoming increasingly prominent.

In the related art, electric vehicles are mainly charged by stationary AC or DC charging spots. A user has to drive a vehicle to a place equipped with a charging spot to charge the vehicle, and drives away when the vehicle is fully charged. This is inconvenient for the user. Moreover, a charging spot is generally built in a parking lot, but reconstruction or construction costs of the parking lot are high before the parking lot is put into use. Also, the load arising from large use of the charging spots has a great impact on a distribution network, and thus distribution network reconstruction costs are high.

SUMMARY

The present disclosure provides a method for charging an electric vehicle, which is replicable and can be popularized, and the method is capable of improving the charging management efficiency of electric vehicles, the time-sharing utilization rate of charging facilities and the utilization rate of electric energy. The present disclosure further provides a mobile charging apparatus for implementing the method so as to shave a peak load, achieve orderly charging, reduce an impact on a distribution network and reduce distribution network reconstruction costs.

A method for charging an electric vehicle is provided. The method includes the steps described below.

A mobile charging apparatus transmits status information thereof to a centralized battery distribution station.

The centralized battery distribution station determines, according to the received status information, whether power of a battery of the mobile charging apparatus is less than a first threshold.

If the power of the battery of the mobile charging apparatus is less than the first threshold, the battery of the mobile charging apparatus is processed so that the power of the battery of the mobile charging apparatus is greater than a second threshold, where the second threshold is greater than the first threshold.

If the power of the battery of the mobile charging apparatus is not less than the first threshold, the mobile charging apparatus charges the electric vehicle.

Optionally, the step in which the battery of the mobile charging apparatus is processed so that the power of the battery of the mobile charging apparatus is greater than the second threshold includes that the battery of the mobile charging apparatus is charged via a local AC or DC charging mode so that the power of the battery of the mobile charging apparatus is greater than the second threshold.

Optionally, the step in which the battery of the mobile charging apparatus is processed so that the power of the battery of the mobile charging apparatus is greater than the second threshold further includes that a battery of which the power is less than the first threshold in the mobile charging apparatus is replaced so that the power of the battery of the mobile charging apparatus is greater than the second threshold.

Optionally, the step in which the battery of which the power is less than the first threshold in the mobile charging apparatus is replaced so that the power of the battery of the mobile charging apparatus is greater than the second threshold includes the steps described below.

The centralized battery distribution station sends a distribution request to a battery replacing and recharging center station via wireless communications.

The battery replacing and recharging center station distributes a fully-charged battery according to the distribution request.

A battery distribution logistics vehicle distributes the fully-charged battery to a position of the mobile charging apparatus and replaces the battery of which the power is less than the first threshold in the mobile charging apparatus with the fully-charged battery.

The battery distribution logistics vehicle carries the replaced battery of which the power is less than the first threshold to the battery replacing and recharging center station for recycling and recharging.

Optionally, the step in which the battery distribution logistics vehicle distributes the fully-charged battery to the position of the mobile charging apparatus includes the steps described below.

The battery distribution logistics vehicle travels to the battery replacing and recharging center station.

A synchronous-belt motor moves the fully-charged battery in the battery replacing and recharging center to a battery lifting device.

The battery lifting device places the fully-charged battery in the distribution logistics vehicle and a count number is recorded.

The distribution logistics vehicle travels to the position of the mobile charging apparatus of which battery is to be replaced.

Optionally, the step in which the battery distribution logistics vehicle travels to the battery replacing and recharging center station includes the steps described below.

Volume data of the battery distribution logistics vehicle recorded by a distribution person of the battery distribution logistics vehicle is received.

A grayscale image recognition method is used to match image data with the volume data recorded by the distribution person and a three-dimensional space coordinate system is calculated and constructed.

A number of fully-charged batteries receivable by the battery distribution logistics vehicle is calculated based on the three-dimensional space coordinate system and sizes of the fully-charged batteries.

Coordinates of positions where the fully-charged batteries are placed in a storage space of the battery distribution logistics vehicle are calculated based on the three-dimensional space coordinate system and the number of the fully-charged batteries, and the fully-charged batteries are positioned.

Optionally, the step in which the battery distribution logistics vehicle carries the replaced battery of which the power is less than the first threshold to the battery replacing and recharging center station for recycling and recharging includes the steps described below.

The battery distribution logistics vehicle travels to the position of the mobile charging apparatus of which the battery is to be recycled so that a distribution person uses a lifting and grabbing device to carry the battery to be recycled to a synchronous belt in the battery replacing and recharging center station.

The battery to be recycled enters a diagnostic area, and the battery to be recycled is charged via an energy storage heap or an electric supply according to time scheduling of a unified dispatching system.

After charging the recycled battery is completed, a maximum power capacity of the recycled battery is determined.

If the maximum power capacity is less than a third threshold, it is determined that the recycled battery is a non-reusable battery which should be retired and then a synchronous-belt motor drives the synchronous belt to pull the retired battery to a decontamination area for processing.

If the maximum power capacity is greater than the third threshold, it is determined that the recycled battery is a reusable battery and then the synchronous-belt motor drives the synchronous belt to pull the reusable battery to a cascade utilization energy storage area for processing.

A control switch and a circuit are installed for the reusable battery in the cascade utilization energy storage area to connect the reusable batteries in series or in parallel in the constructed energy storage heap for storing energy.

Optionally, the status information includes remaining power of the battery of the mobile charging apparatus and position information of the mobile charging apparatus.

The present disclosure further provides a mobile charging apparatus for implementing any method described above. The system includes an automated guided vehicle, a mobile positioning platform, a battery storage compartment, a battery grabbing robot arm, an AC power plug, a power switcher, a charging robot arm, a charging plug, a master control device, a communication device and a metering device.

The automated guided vehicle is configured to automatically travel along a route preset by the mobile positioning platform.

The mobile positioning platform is connected to the master control device and configured to receive a movement instruction transmitted by the master control device, and is configured to make route planning and an anti-collision design for the automated guided vehicle by means of electromagnetic induction guidance, laser guidance or visual guidance and control the automated guided vehicle.

The battery storage compartment is located in the automated guided vehicle and configured to store a battery, where the battery in the battery storage compartment is configured to supply power to an electric vehicle to be charged and supply power to a charging vehicle.

The master control device is configured to control the battery grabbing robot arm to grab the battery in the battery storage compartment in order to put the battery in the battery storage compartment or take the battery out of the battery storage compartment.

The master control device is further configured to control intelligent distribution of power in the battery storage compartment.

When the electric vehicle to be charged is charged by an AC power supply, the AC power plug is externally connected to the AC power supply.

The power switcher is configured to switch between the battery storage compartment and the AC power plug to switch between power supplies for charging the electric vehicle.

The charging plug is connected to the charging robot arm and configured to charge the electric vehicle, where the master control device is configured to control the charging robot arm to operate and the charging robot arm is configured to control the charging plug to be inserted into a charging socket of the electric vehicle.

The communication device is connected to the master control device and configured to communicate with a background management system.

The metering device is connected to the master control device and configured to meter a charging amount and a charging duration of the electric vehicle and transmit information about the charging amount and the charging duration to the master control device.

The master control device is further configured to transmit user information generated from a charging request and order information generated from the information about the charging amount and the charging duration to a user through the background management system.

Optionally, the charging robot arm includes an image recognition device, a control device, a manipulator and a motor drive device.

Optionally, the charging robot arm is configured to acquire image information via the image recognition device, and the control device is configured to control, according to the image information, the motor drive device to drive the manipulator to operate.

The present disclosure further provides a computer program product including a computer program stored on a non-transient computer-readable storage medium, where the computer program includes program instructions that, when executed by a computer, enable the computer to execute any method described above.

The present disclosure further provides a computer-readable storage medium configured to store computer-executable instructions for executing any method described above.

A method for charging an electric vehicle provided by the present disclosure takes into full consideration multiple links including battery charging and replacement, battery distribution and an intelligent mobile charging apparatus. The method is replicable and popularizable.

The method provided by the present disclosure changes a user's parking time at a destination, a work place and a dwelling place into a charging time and takes full advantage of the parking time during entertainment, work and rest, and thus is flexible and capable of achieving the purpose of time-sharing utilization and convenient emergency charging.

The present disclosure can interact with a distribution network in a friendly way and can shave a peak load, achieve orderly charging, reduce an impact on the distribution network and reduce distribution network reconstruction costs.

The present disclosure is beneficial to identity change of operators and participation in electricity market transactions and is applicable to parking lots in residential areas, commercial areas and office areas.

The present disclosure helps property departments expand business areas, manage electric energy and improve the utilization rate of electric energy.

The present disclosure can be widely used in charging management of electric vehicles to improve the charging management efficiency, the time-sharing utilization rate of charging facilities and the utilization rate of electric energy.

DETAILED DESCRIPTION

Figure 1:
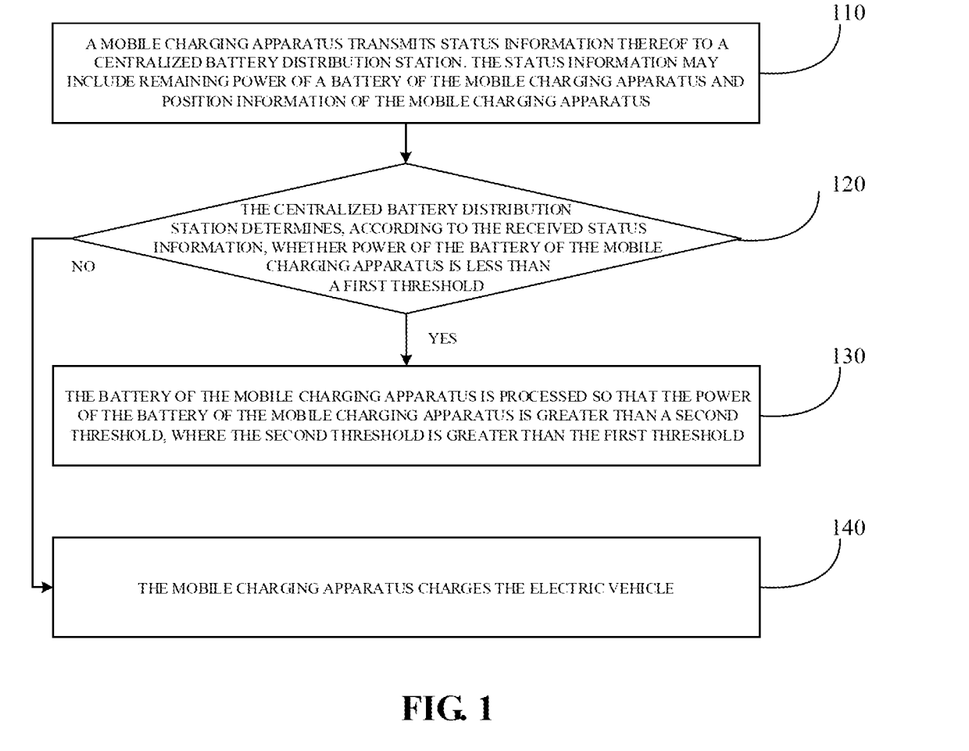
FIG. 1 is a flowchart of a method for charging an electric vehicle according to an embodiment.

As illustrated in FIG. 1, a method for charging an electric vehicle includes the steps described below.

In step 110, a mobile charging apparatus transmits status information thereof to a centralized battery distribution station. The status information may include remaining power of a battery of the mobile charging apparatus and position information of the mobile charging apparatus.

In step 120, the centralized battery distribution station determines, according to the received status information, whether the power of the battery of the mobile charging apparatus is less than a first threshold.

In step 130, if the power of the battery of the mobile charging apparatus is less than the first threshold, the battery of the mobile charging apparatus is processed so that the power of the battery of the mobile charging apparatus is greater than a second threshold, where the second threshold is greater than the first threshold. Illustratively, the first threshold in this embodiment may be 40% of a rated full power of the battery. Illustratively, the second threshold in this embodiment may be 90% of the rated full power of the battery.

In step 140, if the power of the battery of the mobile charging apparatus is not less than the first threshold, the mobile charging apparatus charges the electric vehicle. Optionally, in this embodiment, a battery replacing and recharging center station uniformly distributes batteries required for mobile charging apparatuses and the centralized battery distribution station monitors and manages many mobile charging apparatuses. When the power of the battery is less than a certain power threshold, the centralized battery distribution station prompts a user to charge the battery or to send a distribution request to the battery replacing and recharging center station. The process is repeated in order.

The method for charging the electric vehicle by the mobile charging apparatus according to this embodiment solves the problems of difficulty in charging electric vehicles, low utilization efficiency of charging spots, a great impact of charging facilities on a distribution network and a huge investment in distribution network reconstruction. In actual operation, the method takes into full consideration battery charging, replacement and recycling, battery distribution and new mobile charging apparatuses.

Figure 2:
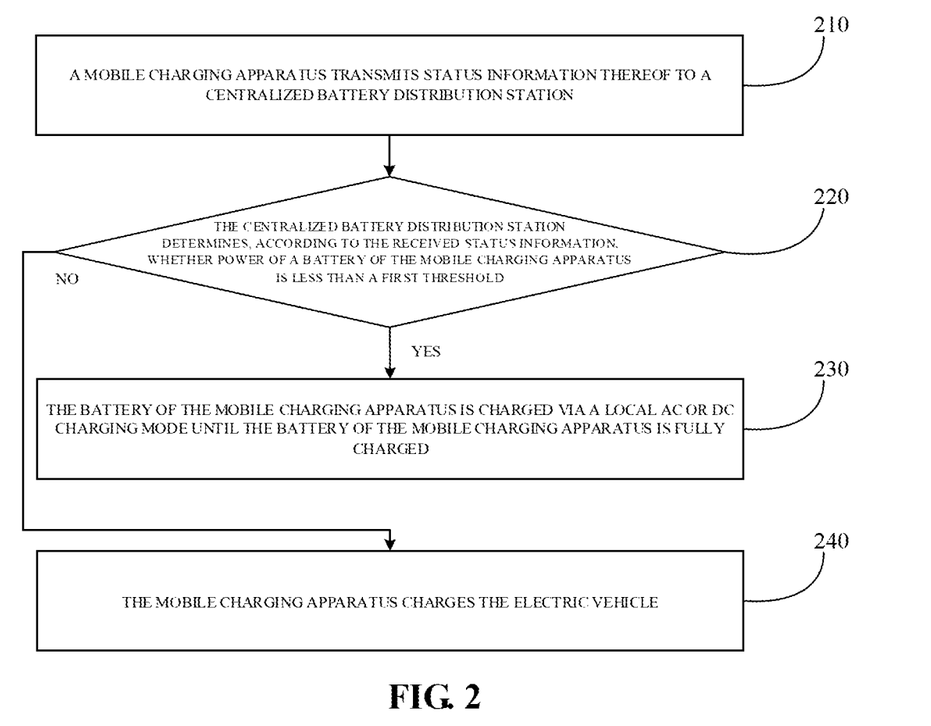
FIG. 2 is a flowchart of a method for charging an electric vehicle according to another embodiment.

As illustrated in FIG. 2, another method for charging an electric vehicle is provided based on the above embodiment. The method includes the steps described below.

In step 210, a mobile charging apparatus transmits status information thereof to a centralized battery distribution station.

In step 220, the centralized battery distribution station determines, according to the received status information, whether power of a battery of the mobile charging apparatus is less than a first threshold.

In step 230, if the power of the battery of the mobile charging apparatus is less than the first threshold, the battery of the mobile charging apparatus is charged via a local alternate current (AC) or direct current (DC) charging mode until the battery of the mobile charging apparatus is fully charged.

In step 240, if the power of the battery of the mobile charging apparatus is not less than the first threshold, the mobile charging apparatus charges the electric vehicle. Optionally, a stationary electric vehicle may be charged in this step.

The mobile charging apparatus and method for charging the electric vehicle according to this embodiment improve charging management efficiency, the time-sharing utilization rate of charging facilities and the utilization rate of electric energy, shave a peak load, achieve orderly charging, reduce an impact on a distribution network and reduce distribution network reconstruction costs.

Figure 3:
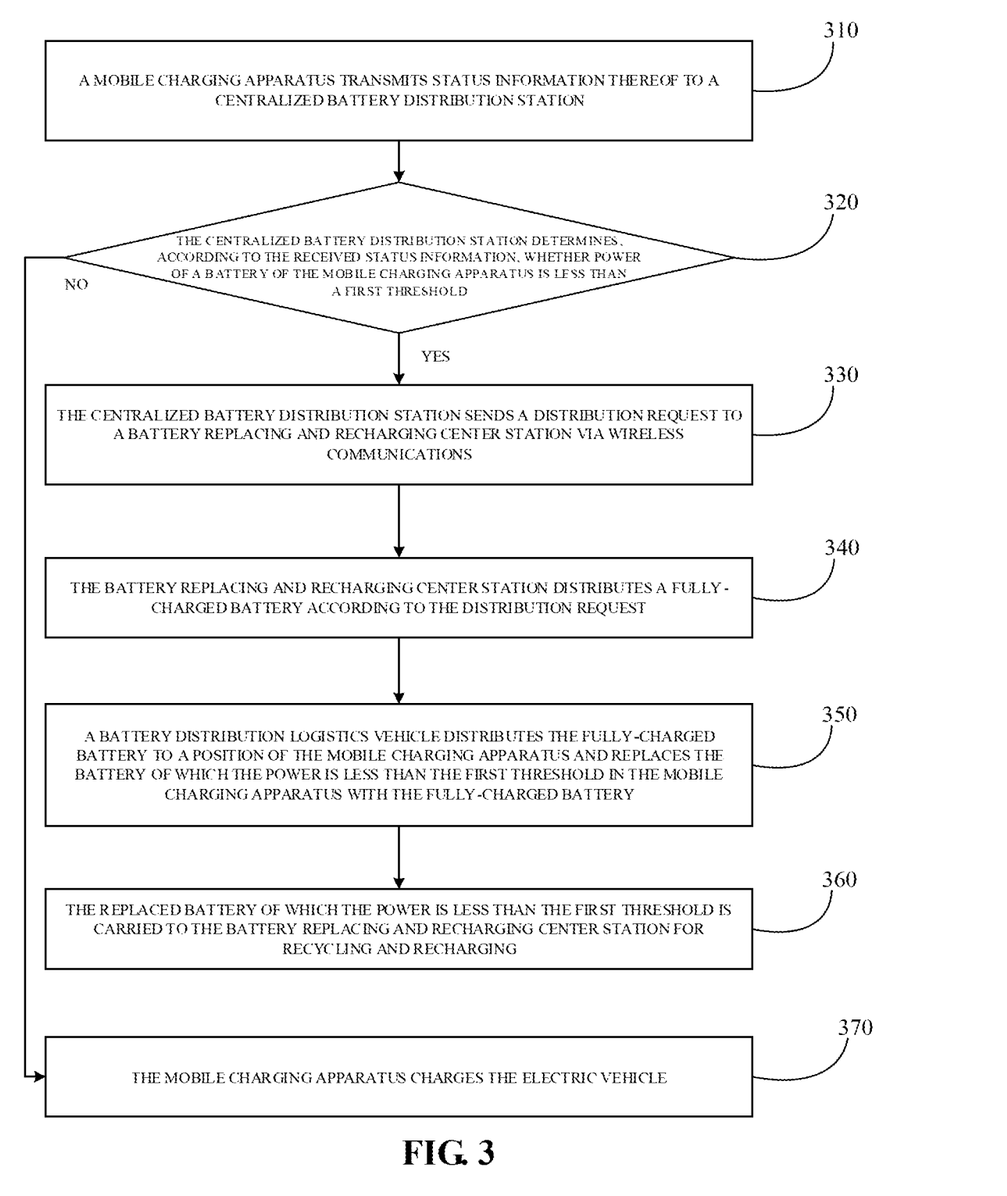
FIG. 3 is a flowchart of a method for charging an electric vehicle according to another embodiment.

As illustrated in FIG. 3, another method for charging an electric vehicle is provided based on the above embodiment. The method includes the steps described below.

In step 310, a mobile charging apparatus transmits status information thereof to a centralized battery distribution station.

In step 320, the centralized battery distribution station determines, according to the received status information, whether power of a battery of the mobile charging apparatus is less than a first threshold.

In step 330, if the power of the battery of the mobile charging apparatus is less than the first threshold, the centralized battery distribution station sends a distribution request to a battery replacing and recharging center station via wireless communications.

In step 340, the battery replacing and recharging center station distributes a fully-charged battery according to the distribution request.

In step 350, a battery distribution logistics vehicle distributes the fully-charged battery to a position of the mobile charging apparatus and replaces with the fully-charged battery the battery of which the power is less than the first threshold in the mobile charging apparatus.

In step 360, the replaced battery of which the power is less than the first threshold is carried to the battery replacing and recharging center station for recycling and recharging.

In step 370, if the power of the battery of the mobile charging apparatus is not less than the first threshold, the mobile charging apparatus charges the electric vehicle.

The method for charging the electric vehicle according to this embodiment solves the problem of low battery power in the mobile charging apparatus, interacts with a distribution network in a friendly way, shaves a peak load, achieves orderly charging, reduces an impact on the distribution network and reduces distribution network reconstruction costs.

Figure 4:
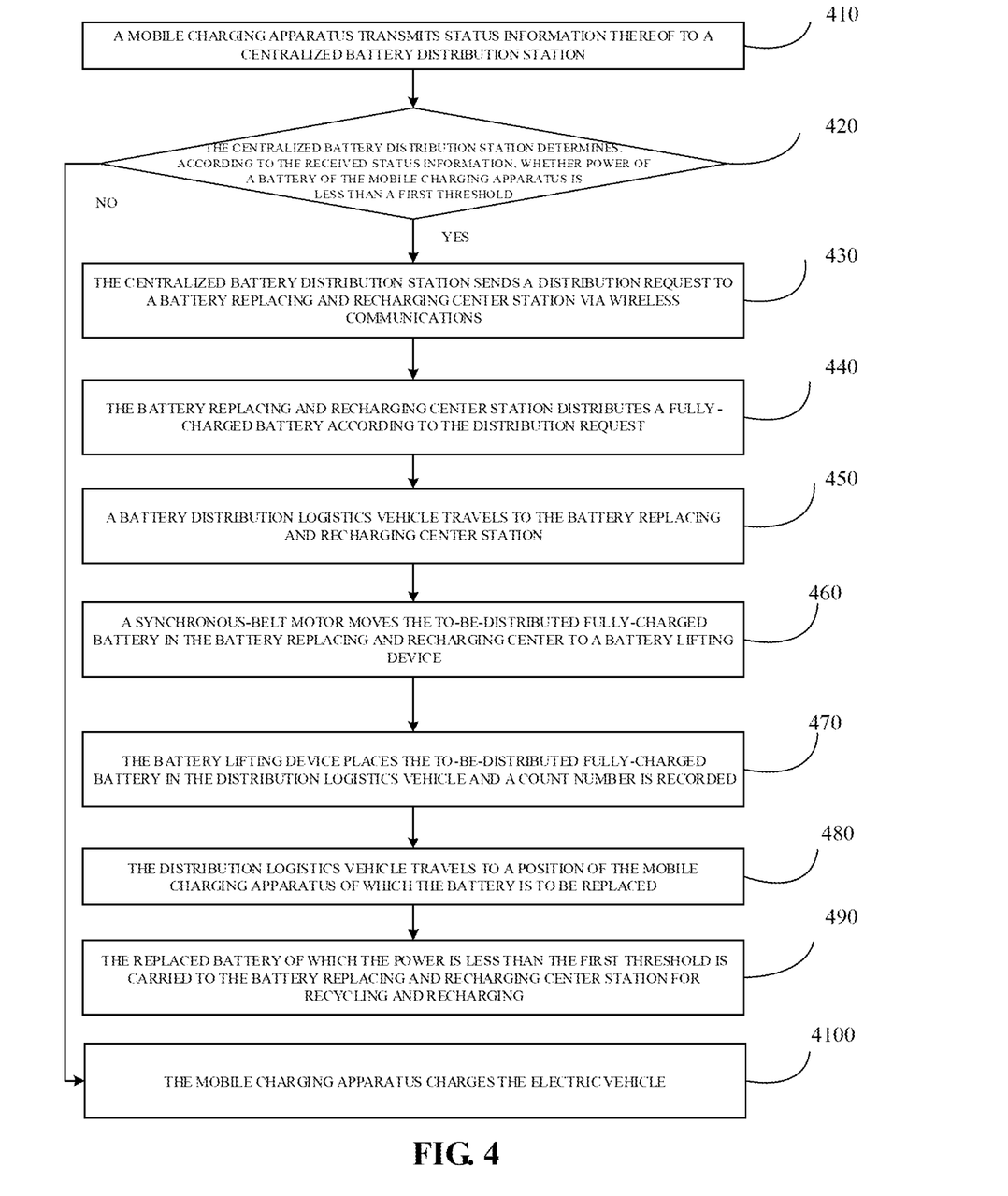
FIG. 4 is a flowchart of a method for charging an electric vehicle according to another embodiment.

As illustrated in FIG. 4, another method for charging an electric vehicle is provided based on the above embodiment. The method includes the steps described below.

In step 410, a mobile charging apparatus transmits status information thereof to a centralized battery distribution station.

In step 420, the centralized battery distribution station determines, according to the received status information, whether power of a battery of the mobile charging apparatus is less than a first threshold.

In step 430, if the power of the battery of the mobile charging apparatus is less than the first threshold, the centralized battery distribution station sends a distribution request to a battery replacing and recharging center station via wireless communications.

In step 440, the battery replacing and recharging center station distributes a fully-charged battery according to the distribution request.

In step 450, a battery distribution logistics vehicle travels to the battery replacing and recharging center station.

In step 460, a synchronous-belt motor moves the fully-charged battery in the battery replacing and recharging center to a battery lifting device.

In step 470, the battery lifting device places the fully-charged battery in the distribution logistics vehicle and a count number is recorded.

In step 480, the distribution logistics vehicle travels to a position of the mobile charging apparatus of which battery is to be replaced.

In step 490, the replaced battery of which the power is less than the first threshold is carried to the battery replacing and recharging center station for recycling and recharging.

In step 4100, if the power of the battery of the mobile charging apparatus is not less than the first threshold, the mobile charging apparatus charges the electric vehicle.

The method for charging the electric vehicle according to this embodiment solves the problem of low battery power in the mobile charging apparatus, interacts with a distribution network in a friendly way, shaves a peak load, achieves orderly charging, reduces an impact on the distribution network and reduces distribution network reconstruction costs.

Figure 5:
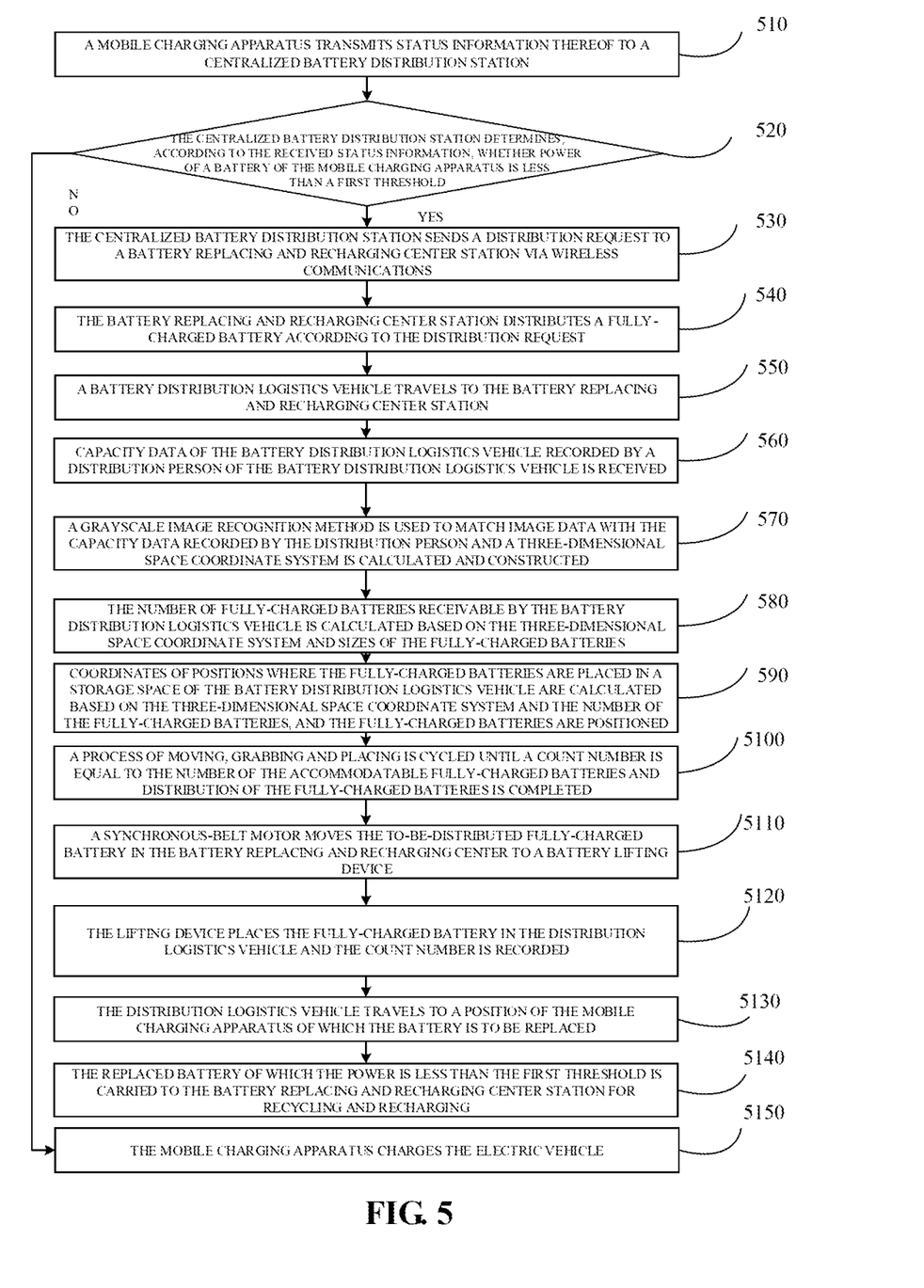
FIG. 5 is a flowchart of a method for charging an electric vehicle according to another embodiment.

As illustrated in FIG. 5, another method for charging an electric vehicle is provided based on the above embodiment. The method includes the steps described below.

In step 510, a mobile charging apparatus transmits status information thereof to a centralized battery distribution station.

In step 520, the centralized battery distribution station determines, according to the received status information, whether power of a battery of the mobile charging apparatus is less than a first threshold.

In step 530, if the power of the battery of the mobile charging apparatus is less than the first threshold, the centralized battery distribution station sends a distribution request to a battery replacing and recharging center station via wireless communications.

In step 540, the battery replacing and recharging center station distributes a fully-charged battery according to the distribution request.

In step 550, a battery distribution logistics vehicle travels to the battery replacing and recharging center station.

In step 560, volume data of the battery distribution logistics vehicle recorded by a distribution person of the battery distribution logistics vehicle is received.

In step 570, a grayscale image recognition method is used to match image data with the volume data recorded by the distribution person to calculate and construct a three-dimensional space coordinate system.

In step 580, the number of fully-charged batteries receivable by the battery distribution logistics vehicle is calculated based on the three-dimensional space coordinate system and sizes of the fully-charged batteries.

In step 590, coordinates of positions of the fully-charged batteries in a storage space of the battery distribution logistics vehicle are calculated based on the three-dimensional space coordinate system and the number of the fully-charged batteries, and the fully-charged batteries are positioned.

In step 5100, a process of moving, grabbing and placing is cycled until a count number is equal to the number of the receivable fully-charged batteries and distribution of the fully-charged batteries is completed.

In step 5110, a synchronous-belt motor moves the fully-charged battery in the battery replacing and recharging center to a battery lifting device.

In step 5120, the battery lifting device places the fully-charged battery in the distribution logistics vehicle and the count number is recorded.

In step 5130, the distribution logistics vehicle travels to a position of the mobile charging apparatus of which battery is to be replaced.

In step 5140, the replaced battery of which the power is less than the first threshold is carried to the battery replacing and recharging center station for recycling and recharging.

In step 5150, if the power of the battery of the mobile charging apparatus is not less than the first threshold, the mobile charging apparatus charges the electric vehicle.

The method for charging the electric vehicle according to this embodiment solves the problem of low battery power in the mobile charging apparatus, interacts with a distribution network in a friendly way, shaves a peak load, achieves orderly charging, reduces an impact on the distribution network and reduces distribution network reconstruction costs.

Figure 6:
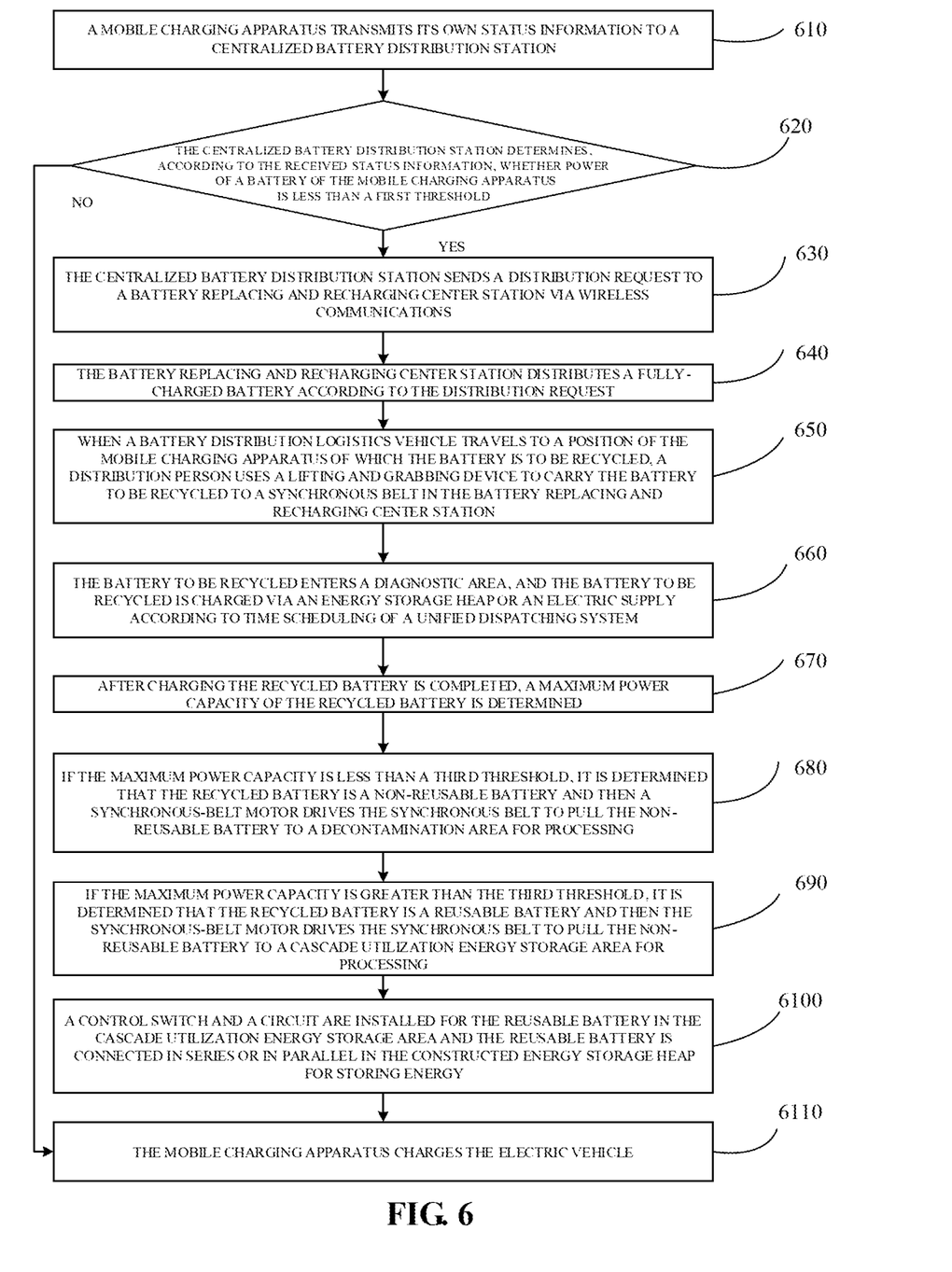
FIG. 6 is a flowchart of a method for charging an electric vehicle according to another embodiment.

As illustrated in FIG. 6, another method for charging an electric vehicle is provided based on the above embodiment. The method includes the steps described below.

In step 610, a mobile charging apparatus transmits status information thereof to a centralized battery distribution station.

In step 620, the centralized battery distribution station determines, according to the received status information, whether power of a battery of the mobile charging apparatus is less than a first threshold.

In step 630, if the power of the battery of the mobile charging apparatus is less than the first threshold, the centralized battery distribution station sends a distribution request to a battery replacing and recharging center station via wireless communications.

In step 640, the battery replacing and recharging center station distributes a fully-charged battery according to the distribution request.

In step 650, when a battery distribution logistics vehicle travels to a position of the mobile charging apparatus of which the battery is to be recycled, a distribution person uses a lifting and grabbing device to carry the battery to be recycled to a synchronous belt in the battery replacing and recharging center station.

In step 660, the battery to be recycled enters a diagnostic area, and the battery to be recycled is charged via an energy storage heap or an electric supply according to time scheduling of a unified dispatching system.

In step 670, after charging the recycled battery is completed, a maximum power capacity of the recycled battery is determined.

In step 680, if the maximum power capacity is less than a third threshold, it is determined that the recycled battery is a non-reusable battery which should be retired and then a synchronous-belt motor drives the synchronous belt to pull the retired battery to a decontamination area for processing. By way of example, the third threshold in this embodiment may be 30% of a rated full power of the battery.

In step 690, if the maximum power capacity is greater than the third threshold, it is determined that the recycled battery is a reusable battery and then the synchronous-belt motor drives the synchronous belt to pull the reusable battery to a cascade utilization energy storage area for processing.

In step 6100, a control switch and a circuit are installed for the reusable battery in the cascade utilization energy storage area to connect the reusable battery with other batteries in series or in parallel in the constructed energy storage heap for storing energy.

In step 6110, if the power of the battery of the mobile charging apparatus is not less than the first threshold, the mobile charging apparatus charges the electric vehicle.

The above embodiments change the user's parking time at a destination, a work place and a dwelling place into a charging time and fully use the parking time during entertainment, work and rest, and thus are flexible and capable of achieving time-sharing utilization and convenient emergency charging; interact with a distribution network in a friendly way, shave a peak load, achieve orderly charging, reduce an impact on the distribution network and reduce distribution network reconstruction costs; contribute to identity change of operators and participation in electricity market transactions and apply to parking lots in residential areas, commercial areas and office areas; and help property departments expand business areas, manage electric energy and improve the utilization rate of electric energy.

Figure 7:
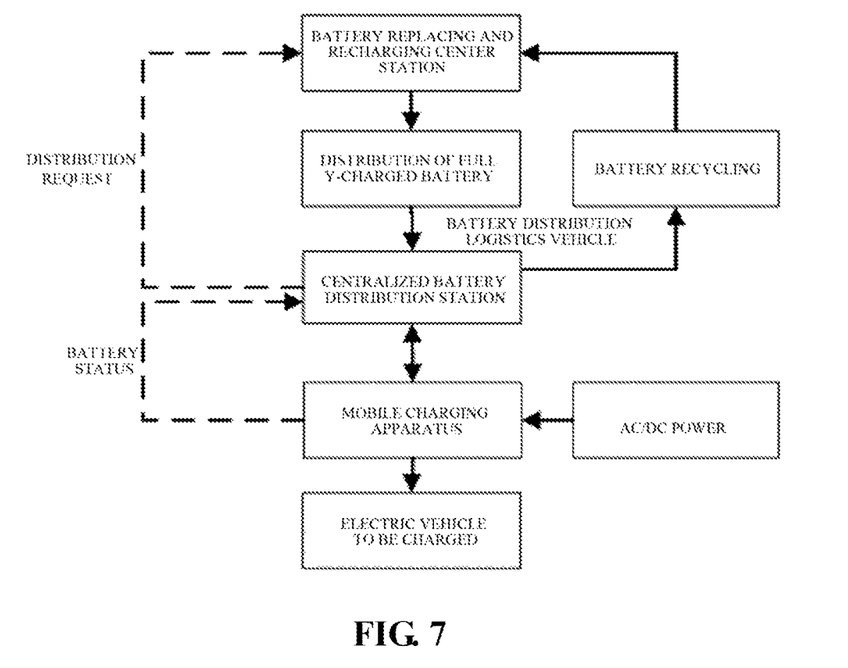
FIG. 7 is a flowchart of a method for charging an electric vehicle according to an embodiment.
Figure 8:
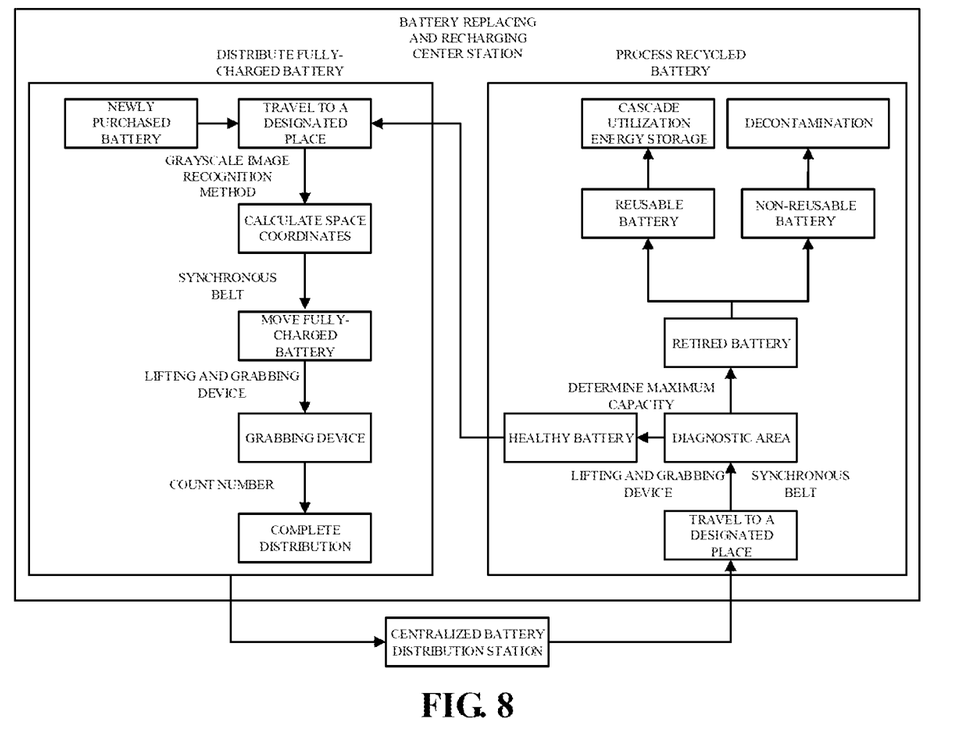
FIG. 8 is a flowchart illustrating a working process of a battery replacing and recharging center station according to an embodiment.
Figure 9:
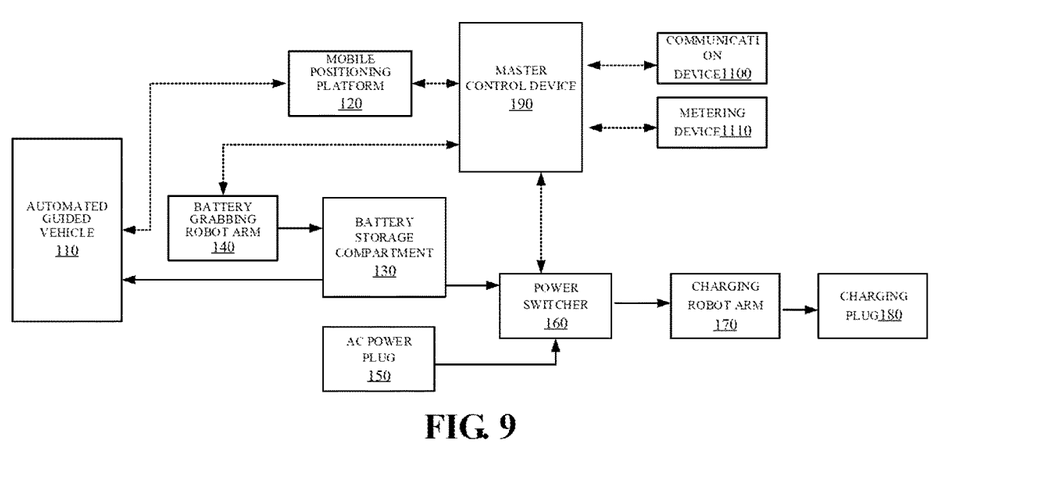
FIG. 9 is a schematic diagram of a mobile charging system for a mobile charging apparatus according to an embodiment.

As illustrated in FIGS. 7, 8 and 9, embodiments of the present disclosure further provide a mobile charging apparatus. The mobile charging apparatus includes an automated guided vehicle 110, a mobile positioning platform 120, a battery storage compartment 130, a battery grabbing robot arm 140, an AC power plug 150, a power switcher 160, a charging robot arm 170, a charging plug 180, a master control device 190, a communication device 1100 and a metering device 1110.

The automated guided vehicle 110 is configured to automatically travel along a route preset by the mobile positioning platform 120.

The mobile positioning platform 120 is connected to the master control device 190 and configured to receive a movement instruction transmitted by the master control device 190, and is configured to make route planning and an anti-collision design for the automated guided vehicle by means of electromagnetic induction guidance, laser guidance or visual guidance and control the automated guided vehicle 110.

The battery storage compartment 130 is located in the automated guided vehicle 110 and configured to store a battery, where the battery in the battery storage compartment 130 is configured to supply power to an electric vehicle to be charged and supply power to a charging vehicle.

The master control device 190 is configured to control the battery grabbing robot arm 140 to grab the battery in the battery storage compartment in order to put the battery in the battery storage compartment 130 or take the battery out of the battery storage compartment 130.

The master control device 190 is further configured to control intelligent distribution of power in the battery storage compartment 130.

When the electric vehicle to be charged is charged by an AC power supply, the AC power plug 150 is externally connected to the AC power supply.

The power switcher 160 is configured to switch between the battery storage compartment 130 and the AC power plug 150 to switch between power supplies for charging the electric vehicle.

The charging plug is connected to the charging robot arm 170 and configured to charge the electric vehicle, where the master control device is configured to control the charging robot arm 170 to operate and the charging robot arm 170 is configured to control the charging plug to be inserted into a charging socket of the electric vehicle.

The communication device 1100 is connected to the master control device 190 and configured to communicate with a background management system.

The metering device 1110 is connected to the master control device 190 and configured to meter a charging amount and a charging duration of the electric vehicle and transmit information about the charging amount and the charging duration to the master control device 190.

The master control device 190 is further configured to transmit user information generated from a charging request and order information generated from the information about the charging amount and the charging duration to a user through the background management system.

The charging robot arm 170 includes an image recognition device, a control device, a manipulator and a motor drive device.

Optionally, the charging robot arm 170 is configured to acquire image information via the image recognition device, and the control device is configured to control, according to the image information, the motor drive device to drive the manipulator to operate.

Embodiments of the present disclosure further provide a computer-readable storage medium configured to store computer-executable instructions for executing any method described above.

INDUSTRIAL APPLICABILITY

The mobile charging apparatus and method for charging the electric vehicle according to the present disclosure improve charging management efficiency, the time-sharing utilization rate of charging facilities and the utilization rate of electric energy, shave a peak load, achieve orderly charging, reduce an impact on a distribution network and reduce distribution network reconstruction costs.

What is claimed is:
1. A method for charging an electric vehicle, comprising:
using a mobile charging apparatus to transmit status information thereof to a centralized battery distribution station;

using the centralized battery distribution station to determine, according to the received status information, whether power of a battery of the mobile charging apparatus is less than a first threshold;

processing, if the power of the battery of the mobile charging apparatus is less than the first threshold, the battery of the mobile charging apparatus to make the power of the battery of the mobile charging apparatus greater than a second threshold, wherein the second threshold is greater than the first threshold; and using, if the power of the battery of the mobile charging apparatus is not less than the first threshold, the mobile charging apparatus to charge the electric vehicle;

wherein the processing the battery of the mobile charging apparatus to make the power of the battery of the mobile charging apparatus greater than the second threshold further comprises:

replacing a battery of which the power is less than the first threshold in the mobile charging apparatus to make the power of the battery of the mobile charging apparatus greater than the second threshold;

wherein the replacing the battery of which the power is less than the first threshold in the mobile charging apparatus to make the power of the battery of the mobile charging apparatus greater than the second threshold comprises:

using the centralized battery distribution station to send a distribution request to a battery replacing and recharging center station via wireless communications;

using the battery replacing and recharging center station to distribute a fully-charged battery to be distributed according to the distribution request;

using a battery distribution logistics vehicle to distribute the fully-charged battery to a position of the mobile charging apparatus and replace with the fully-charged battery the battery of which the power is less than the first threshold in the mobile charging apparatus; and carrying the replaced battery of which the power is less than the first threshold to the battery replacing and recharging center station for recycling and recharging; and wherein the carrying the replaced battery of which the power is less than the first threshold to the battery replacing and recharging center station for recycling and recharging comprises:

enabling the battery distribution logistics vehicle to travel to the position of the mobile charging apparatus of which battery is to be recycled, so that a distribution person uses a lifting and grabbing device to successively carry the batteries to be recycled to a synchronous belt in the battery replacing and recharging center station;

enabling the battery to be recycled to enter a diagnostic area, and charging the battery to be recycled via an energy storage heap or an electric supply according to time scheduling of a unified dispatching system;

after completing charging the recycled battery, determining a maximum power capacity of the recycled battery;

if the maximum power capacity is less than a third threshold, determining that the recycled battery is a non-reusable battery which is considered to be retired, and then using a synchronous-belt motor to drive the synchronous belt to pull the retired battery to a decontamination area for processing;

if the maximum power capacity is greater than the third threshold, determining that the recycled battery is a reusable battery and then using the synchronous-belt motor to drive the synchronous belt to pull the reusable battery to a cascade utilization energy storage area for processing; and installing a control switch and a circuit for the reusable battery in the cascade utilization energy storage area to connect the reusable battery with other batteries in series or in parallel in the constructed energy storage heap for storing energy.

2. The method of claim 1, wherein the processing the battery of the mobile charging apparatus to make the power of the battery of the mobile charging apparatus greater than the second threshold comprises:

charging the battery of the mobile charging apparatus via a local alternating current (AC) or direct current (DC) charging mode until the battery of the mobile charging apparatus is fully charged.

3. The method of claim 1, wherein the status information comprises power of the battery of the mobile charging apparatus and position information of the mobile charging apparatus.

4. A non-transitory computer-readable storage medium, which is configured to store computer-executable instructions for executing the method of claim 1.

5. The method of claim 1, wherein the using the battery distribution logistics vehicle to distribute the fully-charged battery to the position of the mobile charging apparatus comprises:

enabling the battery distribution logistics vehicle to travel to the battery replacing and recharging center station;

using the synchronous-belt motor to move the fully-charged battery in the battery replacing and recharging center to a battery lifting device;

using the battery lifting device to place the fully-charged battery into the distribution logistics vehicle and recording a count number; and enabling the distribution logistics vehicle to travel to the position of the mobile charging apparatus of which the battery is to be replaced.

6. The method of claim 5, wherein the enabling the battery distribution logistics vehicle to travel to the battery replacing and recharging center station comprises:

receiving volume data of the battery distribution logistics vehicle recorded by a distribution person of the battery distribution logistics vehicle;

using a grayscale image recognition method to match image data with the volume data recorded by the distribution person, to calculate and construct a three-dimensional space coordinate system;

calculating, based on the three-dimensional space coordinate system and sizes of the fully-charged batteries, the number of fully-charged batteries receivable by the battery distribution logistics vehicle; and calculating, based on the three-dimensional space coordinate system and the number of the fully-charged batteries, coordinates of positions of the fully-charged batteries in a storage space of the battery distribution logistics vehicle, and positioning the fully-charged batteries.

7. A mobile charging apparatus comprising: an automated guided vehicle, a mobile positioning platform, a battery storage compartment, a battery grabbing robot arm, an AC power plug, a power switcher, a charging robot arm, a charging plug, a master control device, a communication device and a metering device, wherein the automated guided vehicle is configured to automatically travel along a route preset by the mobile positioning platform;

the mobile positioning platform is connected to the master control device and configured to receive a movement instruction transmitted by the master control device, and is configured to make route planning and an anti-collision design for the automated guided vehicle by means of electromagnetic induction guidance, laser guidance or visual guidance and control the automated guided vehicle;

the battery storage compartment is located in the automated guided vehicle and configured to store a battery, where the battery in the battery storage compartment is configured to supply power to an electric vehicle to be charged and supply power to the automated guided vehicle;

the master control device is configured to control the battery grabbing robot arm to grab the battery in the battery storage compartment;

the master control device is further configured to control intelligent distribution of power in the battery storage compartment;

when the electric vehicle to be charged is charged by an AC power supply, the AC power plug is externally connected to the AC power supply;

the power switcher is configured to switch between the battery storage compartment and the AC power plug to switch between power supplies for charging the electric vehicle;

the charging plug is connected to the charging robot arm and configured to charge the electric vehicle, where the master control device is configured to control the charging robot arm to operate and the charging robot arm is configured to control the charging plug to be inserted into a charging socket of the electric vehicle;

the communication device is connected to the master control device and configured to communicate with a background management system;

the metering device is connected to the master control device and configured to meter a charging amount and a charging duration of the electric vehicle and transmit information about the charging amount and the charging duration to the master control device; and the master control device is further configured to transmit user information generated from a charging request and order information generated from the information about the charging amount and the charging duration to a user through the background management system;

wherein the mobile charging apparatus is configured to implement the following steps:

using the mobile charging apparatus to transmit status information thereof to a centralized battery distribution station;

using the centralized battery distribution station to determine, according to the received status information, whether power of a battery of the mobile charging apparatus is less than a first threshold;

processing, if the power of the battery of the mobile charging apparatus is less than the first threshold, the battery of the mobile charging apparatus to make the power of the battery of the mobile charging apparatus greater than a second threshold, wherein the second threshold is greater than the first threshold; and using, if the power of the battery of the mobile charging apparatus is not less than the first threshold, the mobile charging apparatus to charge the electric vehicle;

wherein the processing the battery of the mobile charging apparatus to make the power of the battery of the mobile charging apparatus greater than the second threshold further comprises:

replacing a battery of which the power is less than the first threshold in the mobile charging apparatus to make the power of the battery of the mobile charging apparatus greater than the second threshold;

wherein the replacing the battery of which the power is less than the first threshold in the mobile charging apparatus to make the power of the battery of the mobile charging apparatus greater than the second threshold comprises:

using the centralized battery distribution station to send a distribution request to a battery replacing and recharging center station via wireless communications;

using the battery replacing and recharging center station to distribute a fully-charged battery to be distributed according to the distribution request;

using a battery distribution logistics vehicle to distribute the fully-charged battery to a position of the mobile charging apparatus and replace with the fully-charged battery the battery of which the power is less than the first threshold in the mobile charging apparatus; and carrying the replaced battery of which the power is less than the first threshold to the battery replacing and recharging center station for recycling and recharging; and wherein the carrying the replaced battery of which the power is less than the first threshold to the battery replacing and recharging center station for recycling and recharging comprises:

enabling the battery distribution logistics vehicle to travel to the position of the mobile charging apparatus of which battery is to be recycled, so that a distribution person uses a lifting and grabbing device to successively carry the batteries to be recycled to a synchronous belt in the battery replacing and recharging center station;

enabling the battery to be recycled to enter a diagnostic area, and charging the battery to be recycled via an energy storage heap or an electric supply according to time scheduling of a unified dispatching system;

after completing charging the recycled battery, determining a maximum power capacity of the recycled battery;

if the maximum power capacity is less than a third threshold, determining that the recycled battery is a non-reusable battery which is considered to be retired, and then using a synchronous-belt motor to drive the synchronous belt to pull the retired battery to a decontamination area for processing;

if the maximum power capacity is greater than the third threshold, determining that the recycled battery is a reusable battery and then using the synchronous-belt motor to drive the synchronous belt to pull the reusable battery to a cascade utilization energy storage area for processing; and installing a control switch and a circuit for the reusable battery in the cascade utilization energy storage area to connect the reusable battery with other batteries in series or in parallel in the constructed energy storage heap for storing energy.

8. The mobile charging apparatus of claim 7, wherein the charging robot arm comprises an image recognition device, a control device, a manipulator and a motor drive device, wherein the charging robot arm is configured to acquire image information via the image recognition device, and the control device is configured to control, according to the image information, the motor drive device to drive the manipulator to operate.

\* \* \* \* \*